United States Patent [19]

Rowland-Hill

[11] 4,249,543
[45] Feb. 10, 1981

[54] ROTOR ACCESS MODULE

[75] Inventor: Edward W. Rowland-Hill, Lancaster, Pa.

[73] Assignee: Sperry Corporation, New Holland, Pa.

[21] Appl. No.: 90,783

[22] Filed: Nov. 2, 1979

[51] Int. Cl.³ ............................................. A01F 12/00
[52] U.S. Cl. ................................. 130/27 T; 130/27 J
[58] Field of Search ................. 130/27 T, 27 J, 27 K, 130/27 L, 27 R; 56/14.6

[56] References Cited

U.S. PATENT DOCUMENTS

| | | | |
|---|---|---|---|
| 3,470,881 | 10/1969 | Knapp et al. | 130/27 T |
| 3,626,472 | 12/1971 | Rowland-Hill | 130/27 T |
| 3,696,815 | 10/1972 | Rowland-Hill | 130/27 T |
| 3,742,686 | 7/1973 | Rowland-Hill | 130/27 T |
| 3,871,384 | 3/1975 | Depauw | 130/27 T |
| 3,995,645 | 12/1976 | Rowland-Hill | 130/27 T |
| 4,177,820 | 12/1979 | Rowland-Hill | 130/27 T |

*Primary Examiner*—Jay N. Eskovitz
*Attorney, Agent, or Firm*—Frank A. Seemar; James R. Bell; Larry W. Miller

[57] ABSTRACT

In a crop harvesting and threshing machine of the type utilizing axial flow threshing and separation, there is provided an access unit to the threshing and separating apparatus which is removably insertable through the side of the harvesting and threshing machine into the rotor casing. The access unit has threshing grates attached to the portion nearest the threshing and separating apparatus so that when inserted the access unit serves to aid in the threshing and separating of the grain from the crop material and when removed provides easy access to the threshing and separating apparatus.

5 Claims, 4 Drawing Figures

ROTOR ACCESS MODULE

BACKGROUND OF THE INVENTION

This invention relates generally to crop harvesting and threshing machines, more commonly known as combines, and more particularly to the type of combine commonly referred to as an axial flow type of combine. The axial flow type of combine is characterized by having the crop material pass axially through an elongate housing which has a separate casing therein that surrounds each threshing and separating apparatus or rotor. The crop material is passed spirally rearward about the rotors contained within each casing. Specifically, the invention is concerned with providing a structure that is easily removed from the side frame of the combine to permit quick and convenient access to the rotor area. This access unit or rotor access module permits the operator to service the rotor and its underlying concaves in a minimum of time and without the need for any special tools or assistance. This invention is equally applicable to an axial flow type of combine utilizing either a single threshing or separating rotor, multiple threshing and separating rotors, or any comparable apparatus utilized for rotary threshing and separation.

Conventional combines pass the crop material to be threshed between a rotary cylinder and a stationary concave in a direction that is normal to the axis of the rotating cylinder and parallel with the longitudinal axis of the combine frame. In this system much of the grain contained in the crop material fed to the cylinder and the concave passes through the concave as threshed grain. The remainder of the material is conveyed to separating elements of the combine that traditionally include reciprocating or oscillating straw walkers, grain pans and chaffer sieves. Because of the combined effect of the transverse orientation of the rotary cylinder and the single pass of crop material about the cylinder during threshing, there is less of an urgent need to have convenient and rapid access to the threshing area. Since the threshing concave and cylinder extends transversely across the width of a conventional combine, access at one particular relatively narrow point in either side or both sides of the combine permits servicing of the entire width of the concave and threshing cylinder.

Combines of the axial flow type, in contrast, utilize single or dual threshing and separating apparatus, such as rotors, that permit the crop material to pass over the concave during the threshing process three or more times. The concaves run from front to rear and generally underlie a single or dual rotor system that is parallel to the longitudinal axis of the combine. This longer area of contact between the rotors and the concaves of necessity requires a larger access area for the operator when servicing the rotors and the concaves.

This need for convenient access to the rotor and concave area in the relatively recently commercially developed axial flow types of combines was early recognized by the designers of these machines. Relatively elongated access plates were provided on the sides of the frames of some of these early axial flow type of combines to permit a substantial portion of the threshing area to be serviced at one time. However, simply having access to the threshing and separating area of the axial flow combines did not solve the entire problem since the concaves still had to be serviced in a restricted area, as well as having to be removed in order to reach the rotor.

Different approaches were attempted to provide easily removable concave sections underlying the threshing portion of the rotors. One of these early approaches requires that the header and infeed housing mounted to the front portion of the combine be removed entirely from the combine base unit before the concave sections are slid forwardly out of their mountings. Another approach involves the utilization of linkages which permit the forward portion of the concave to be pivoted toward the side of the machine to remove it from the rotor casing. This solved the problem of providing an easy way to change the wire inserts in the concave sections, but did little to improve accessibility to the rotor and the remaining portions of the concaves. None of the aforementioned approaches provided a technique that would permit easy access to the rotor and the remaining concaves for servicing. Additionally, when concave extensions were utilized the separate fasteners utilized to hold them in place in the rotor casings had the potential to come loose and fall out or merely fail because of the high level of vibrational activity in the area surrounding the rotating rotors.

The foregoing problems are solved with the design of the machine comprising the present invention by providing a rotor access module that is removably insertable through the frame of a combine into the rotor casing with an interior portion that cooperates with the existing concaves as an integral part of the rotor casing during the threshing and separating cycle when it is fully inserted and when removed from the casing and the frame provides easy access to the rotor and concaves for servicing.

SUMMARY OF THE INVENTION

It is an object of the present invention to provide in a combine of the axial flow type an access unit that is easily removable from the side frame of a combine to permit easy servicing of the threshing and separating rotor and the concaves underlying the rotor.

It is a further object of the present invention to provide a simple, and low cost access unit that is modular in form and which includes grates which serve as an extension of the concaves on its innermost portion to aid in the threshing and separation of the crop material.

It is a feature of the present invention that there are provided deflectors attached to the access unit or module which serve to evenly distribute the threshed grain across the grain receiving surface or grain pan which underlies the threshing and separating rotors.

It is an advantage of the present invention that the rotor area and the concaves are easily accessible for servicing without the need for any special tools.

It is a further advantage of the present invention that the rotor access module is relatively simple of design and low cost in nature.

It is another advantage of the present invention that the means to secure the extension of the concaves in place in the rotor casing are not easily susceptible to failure since the extension is part of a unitary module that is inserted and removed as a unit.

These and other objects and advantages are obtained by providing a rotor access module in a crop harvesting and threshing machine of the type utilizing at least one axial flow threshing and separating rotor within a generally cylindrical elongate casing such that the access module is removably insertable through the side of the harvesting and threshing machine into the rotor casing and has threshed grates attached to the portion of the module closest the rotor so that when inserted the module serves to aid in the threshing and separating of the grain from the crop material and when removed provides easy access to the threshing and separating apparatus.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
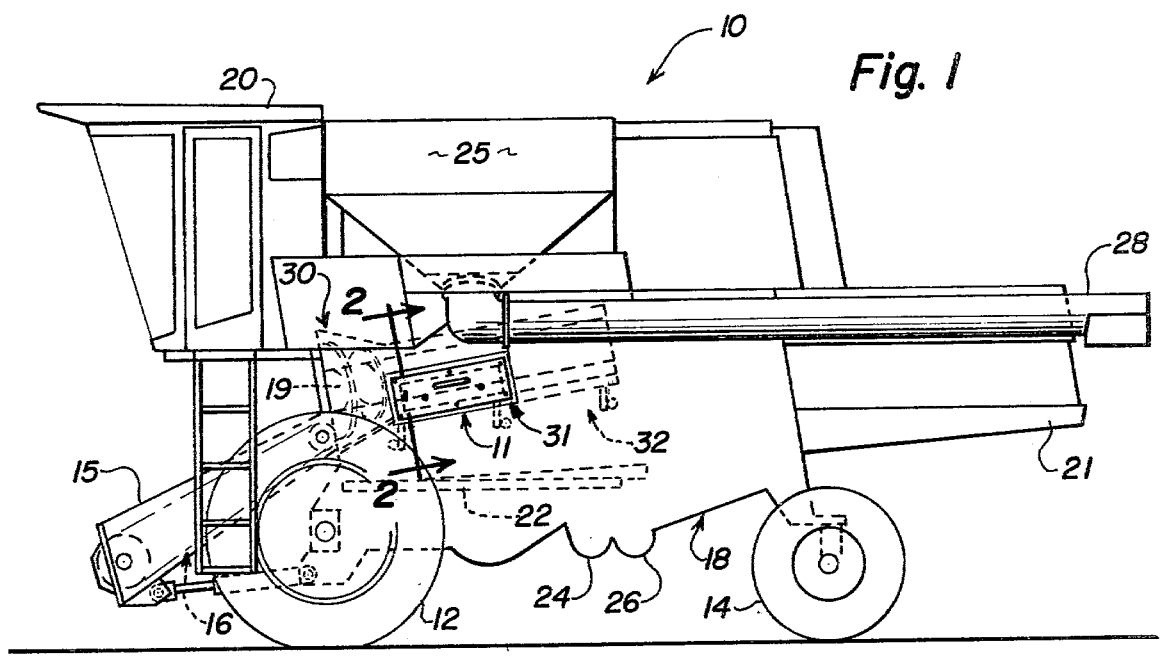
FIG. 1 is a side elevation view of a crop harvesting and threshing machine illustrating the location of the rotor access module on the frame.

Referring to FIG. 1, there is shown a combine 10 in a side elevational view with the location of the rotor access module illustrated and indicated generally by the numeral 11. As can be seen, the combine 10 has a mobile frame mounted to a pair of primary driving wheels 12 in front and a pair of smaller steerable wheels 14 in the rear. The combine is powered by an engine (not shown), usually a diesel engine of high horsepower. The engine is mounted to the upper portion of the combine in a suitable fashion and, by means of drive belts or sprocket driven chains, is drivingly connected to the operational components of the combine.

Still referring to FIG. 1, the combine 10 has an infeed housing 15 with a crop elevator, indicated generally by the numeral 16, fastened to its front. Combine 10 has a main frame or housing, indicated generally by the numeral 18, that internally supports the two threshing and separating rotors 19, only one of which is partially shown in FIG. 1. The operator's cab 20 extends forwardly over the front of the main frame 18 and is atop the infeed housing 15. A rear housing 21 encloses the rear of the combine 10 and covers the discharge beater and discharge grate assembly, both of which are not shown.

The main frame 18 also supports a grain pan 22 and grain cleaning means, not shown. The grain pan 22 collects the threshed and cleaned grain and moves it to a grain trough 24, which spans the width of the combine along the bottom of the frame. The trough is open-topped and has an auger, not shown, rotatably mounted therein to convey the cleaned grain through a grain transfer chute, also not shown, which carries the grain upwardly into the grain tank 25. When it is necessary to unload the full grain tank 25 an unloading auger, not shown, is pivoted within an unloading auger tube 28. Tube 28 is movable between inboard and outboard positions with respect to the longitudinal axis of the combine and is effective to discharge the threshed and cleaned grain from the grain tank to the receiving vehicle or container. Unthreshed grain, commonly known as tailings, is collected in trough 26 and is returned in a conventional manner to the rotors 19 for rethreshing. The cleaning system within the combine functions to take unthreshed grain which remains in the crop material, separate it from the cleaned grain and the chaff, and direct it into this tailings trough 26.

Figure 2:
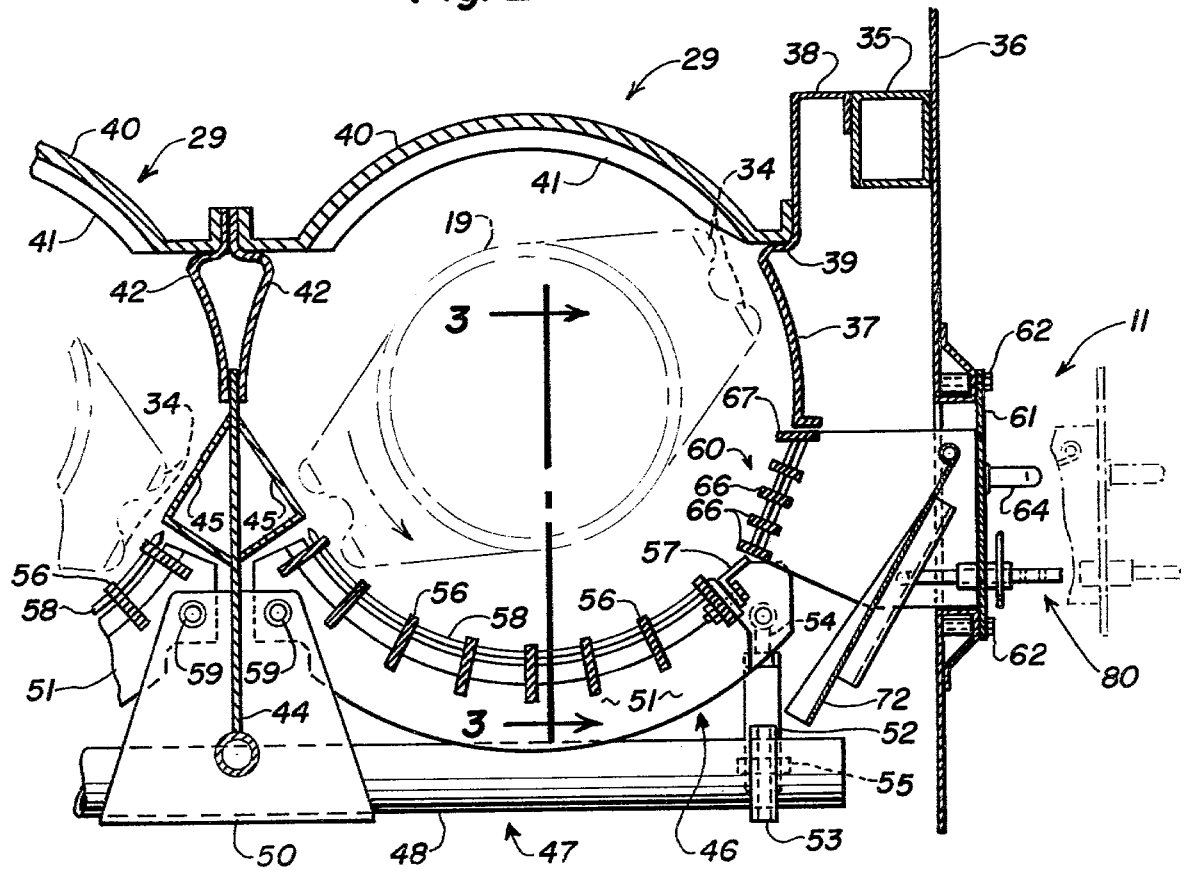
FIG. 2 is an enlarged partial front elevation view of the rotor casings taken along the section line 2—2 of FIG. 1 showing the rotor access module inserted through the frame and forming an extension of the concave section of the rotor casing.

Both of the rotors 19 are enclosed in individual elongate and generally cylindrical rotor casings 29, best illustrated in fragmentary fashion in FIG. 2. Both the rotors 19 and the rotor casings 29 are divided into infeed areas, threshing areas and separating areas. The infeed areas are shown generally by the areas defined by the numeral 30 in FIG. 1. The threshing areas, partially illustrated in FIG. 1, run immediately rearwardly of the infeed areas to a point indicated generally by the numeral 31. The separating areas are shown generally by the numeral 32 in FIG. 1. The infeed areas 30 are located generally in the forward portion of the rotor casings 29 adjacent the infeed housing 15. The pairs of auger flighting mounted on the infeed portion of each of the rotors 19 spiral about the rotors and serve to deliver the stream of crop material brought from the header through the infeed housing 15 via the crop elevator 16 rearwardly into contact with the rasp bars 34, see briefly FIG. 2, that are fastened to and generally define the threshing portions of the rotors 19.

The structure thus far has been described generally since it is old and well-known in the art. This structure and the interrelationships between the various operating components of a combine are described in greater detail in U.S. Pat. No. 3,626,472, issued Dec. 7, 1971; 3,742,686, issued July 3, 1973; and 3,995,645 issued Dec. 7, 1976; all to Rowland-Hill, hereinafter specifically incorporated by reference in their entirety, insofar as they are consistent with the instant disclosure.

Looking now at FIG. 2, rotor casings 29 are supported by structural members of the main frame 18. A support beam 35 has mounted thereagainst a side frame sheet 36. The rotor casings 29 are anchored to support beam 35 by casing bracket member 38. Bracket member 38 has a shelf type portion 39 which serves as a support for the rotor casing cover 40. The lower portion 37 of bracket member 38 is arcuate in shape and forms a portion of the generally cylindrical periphery of the rotor casing 29. On the underside of the rotor casing cover 40 is a transport fin 41 which assists in guiding the crop material rearwardly as the crop material is spiralled about each rotor 19. The support bracket 42 adjoins and supports each of the rotor casing covers 40 and is mounted at its bottommost portion to dividing member 44. The support bracket 42 is curved to conform to the generally cylindrical shape of each of the rotor casings 29 beneath the casing covers 40. Mounted to dividing member 44 within each rotor casing 29 is a guide member 45. Guide member 45 is suitably shaped to also conform to the generally cylindrical contour of the interior of each of the rotor casings 29.

The lower portion of each casing 29 is adjustably mounted to a separate linkage and sub-frame apparatus. Dividing member 44 is securely fastened to bracket member 50 which is mounted to the concave cradle linkage, indicated generally by the numeral 47, via the front hinge shaft 48. The concave cradle linkage 47 is essentially the sub-frame that supports the concaves beneath the rotors 19. This cradle linkage is generally an H-shaped configuration with the front hinge shaft 48 and the rear hinge shaft 49 (see briefly FIG. 3) forming a pair of parallel transverse cross bars. A longitudinal central bar, not shown, connects the two so that the entire cradle linkage lies beneath the rotors 19 and the two concave assemblies, indicated generally by the numeral 46, and within the side frame sheets 36. The two concave assemblies 46 underlie the rotors 19, one assembly per rotor.

Figure 3:
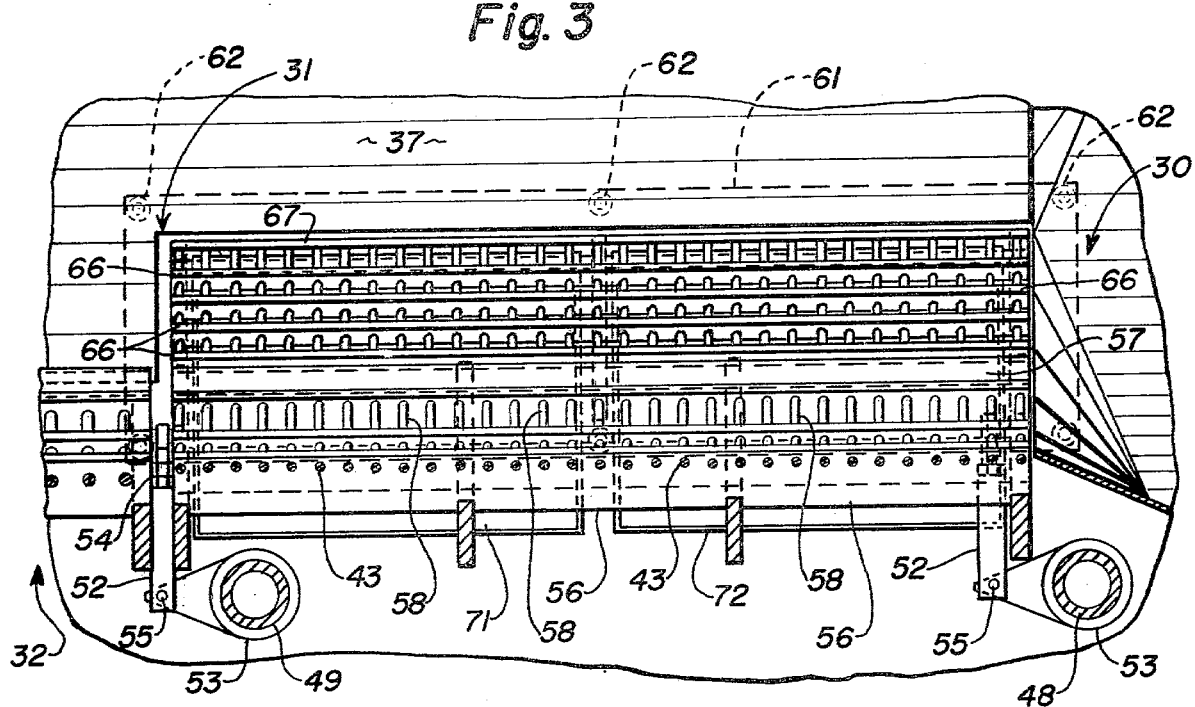
FIG. 3 is an enlarged partial side elevation view of the rotor casing taken along the section line 3—3 of FIG. 2 showing the interior view of the rotor access module with the grates forming the extension part of the threshing concave.

Each concave assembly 46, as seen in FIGS. 2 and 3, has a concave weld assembly 51 which is supported at its outer edges by front and rear pivotal support linkages 54. The length of each of the support linkages 54 is adjustable by turnbuckles 52. Turnbuckles 52 are mounted about their respective front and rear hinge shafts, 48 and 49, by collars 53. Studs 55 connect the turnbuckles 52 to the collars 53.

As best seen in FIG. 2, each concave assembly 46 includes a plurality of threshing bars 56, extending longitudinally along the length of the combine 10, and a plurality of transversely curved rods 58 which pass through apertures 43, see briefly FIG. 3, in the bars 56. Each concave assembly further comprises front and rear curved concave weld assemblies 51. Attached to the outermost portion of each concave assembly 46 is a spacer member 57. On the interior sides of each of the rotor casings 29 and on the adjacent sides of each of the concave assemblies 46, the concave weld assemblies 51 are supported on pivot pins 59. Pins 59 insert through apertures in the bracket 50 of the front portion of the combine and through a similarly oriented bracket, not shown, at the rear of the concave cradle linkage 47.

Figure 4:
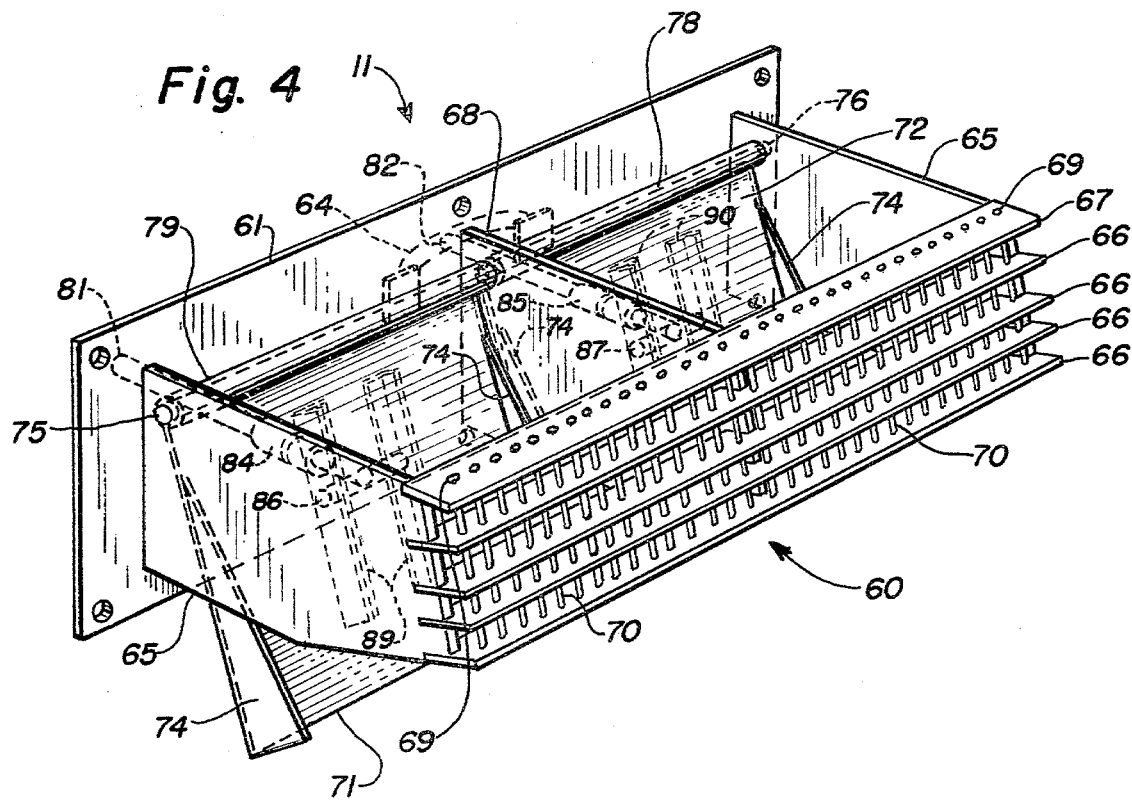
FIG. 4 is a perspective view of the rotor access module removed from the combine showing the deflectors and grating attached to the unit.

A rotor access module 11 inserts through one of the side frame sheets 36 to form a concave extension 60, supplementing the concave assembly 46. Spacer member 57 of FIG. 2 ensures a close fitting between the concave extension 60 and the concave assembly 46 to prevent unthreshed crop material and chaff from passing therebetween and falling into the grain pan 22. As seen in FIGS. 2, 3 and 4, the rotor access module 11 includes an exterior covering member 61, which is fastened to side frame sheet 36 by a plurality of appropriate fasteners 62. Module 11 has a handle 64 attached to the cover plates 61 to facilitate removal from the combine. As best seen in FIGS. 2 and 4, the access module 11 has side members 65 appropriately fastened to the cover plate 61. Appropriately fastened to the opposing side plates 65 are concave extension threshing bars 66 and 67. An intermediate support plate 68 connects the access module cover plate 61 and the concave extension and threshing bars 66 and 67. Bars 66 are aligned in parallel fashion while bar 67 is generally horizontal so that it mates with the bottom of the angular portion 37 of bracket member 38, best seen in FIG. 2. A series of apertures 69 are punched or otherwise suitably placed within each of the extension threshing bars 66 such that rod-like members 70 may be inserted through a correspondingly aligned aperture in each of the extension threshing bars. The combined effect of the rod-like members 70 is to provide an auxiliary threshing and separating surface or extension of the concaves which permits the grain to be threshed by the threshing bars 66 and then separated from the remaining crop material to pass through the spaces provided between the rod-like members 70 and the threshing bars 66.

As best seen in FIG. 4, the rotor access module 11 also has a pair of deflector plates 71 and 72 hingedly mounted to side plates 65 and intermediate support plate 68. The forward and rearward ends of deflector plates 71 and 72 have triangularly shaped guide plates 74 attached to prevent the threshed crop material from passing over the edges of the deflector plates 71 and 72 and falling on other than the grain pan 22. Deflector plates 71 and 72 are hingedly mounted to the rotor access module 11 by rotatable shafts 75 and 76 held within sleeves 78 and 79, respectively. Deflector plates 71 and 72 are adjustably positioned via the adjustment assembly, indicated generally by the numeral 80 in FIG. 2. There is an adjustment assembly 80 for each deflector plate 71 and 72. The adjustment assemblies 80 comprise adjustment rods 81 and 82, as seen in FIG. 4, slidably mounted within collars 84 and 85, all of which pass through the cover plate 61. Adjustment rods 81 and 82 are fastened to cross members 86 and 87, respectively. Cross members 86 and 87 are slidably movable within paired tracks 89 and 90.

In operation the combine 10 moves across a field of crop material where the header gathers the crop material and consolidates it. The crop material is transferred from the header upwardly into the infeed area 30 by the crop elevator 16 within the infeed housing 15. The crop material is thus brought into contact with the counter-rotating rotors 19 in the infeed area 30 and passes rearwardly into the rotor casings 29. The crop material is successively passed through the threshing area 31 and the separating area 32. The rasp bars 34, mounted to the rotors 19, cooperate with the concave assemblies 46 and the concave extensions 60 of the rotor access modules 11 to thresh the grain and partially separate if from the crop material. Deflector plates 71 and 72 are positioned via the deflector plate adjustment assemblies 80 to catch the threshed grain as it passes through the threshing bars 66 and 67 and rod-like members 70 of the concave extensions 60 to guide the grain onto the grain pan 22. When it is necessary to service the rotors 19 or the concave assembly 46, the rotor access module 11 is removed from the side frame sheet 36 and the rotor casing 29 by removing the rotor access module cover plate fasteners 62. This permits the entire access module 11 to be slidably removed from the combine and the operator to have access into the critical threshing area within each casing.

It should also be noted that the rotor access module 11 could also be fastened to the frame side sheet 36 in varying manners that could add to the functional effectiveness of the rotors 19 and the convenience of the combine 10 in general. For example, the fasteners 62 could have shims or spacers inserted over them and between the frame side sheet 36 and the module cover plate 61 to effectively position the entire module 11 further out from the centerline of the combine 10. This will move the concave extension 60 outwardly also, thereby creating more clearance between the threshing bars 66 and the rotors 19. This can be desirable in certain crops such as rice or maize where a flailing action rather than a rubbing action is more effective. Also, the module 11 could be hingedly fastened to the frame side sheet 36 so the module 11 could be easily pivoted out of the casing 29 and secured by a latching mechanism to the frame side sheet 36 in a convenient manner.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention, what is claimed is:

1. In a harvesting and threshing machine for harvesting crop material from a field having:
    (a) a mobile frame having a front end and a rear end;
    (b) rotary threshing and separating means mounted to the frame in longitudinal orientation therewith having a first portion nearer the front end for threshing and a second portion nearer the rear end for separating grain from the crop material;
    (c) drive means mounted to the frame to propel the machine across the field and to drive the threshing and separating means;
    (d) an elongate generally cylindrical casing means fastened to the frame surrounding the threshing and separating means;
    (e) grain receiving means fastened to the frame and underlying the casing means; and
    (f) a rotor access module having a first portion attached to said frame, and having a second portion forming a concave portion of said casing means, said second portion including a plurality of threshing bars, said first and second portions interconnected, in spaced apart relationship, by side plates, said module further having at least one deflector plate connected to said side plates.

2. The harvesting and threshing machine according to claim 1 wherein said deflector plate is pivotally connected between said side plates.

3. The harvesting and threshing machine according to claim 2 including: means connected for pivotally moving said deflector plates.

4. In a harvesting and threshing machine for harvesting grain bearing crop material from the field having:
    (a) a mobile frame;
    (b) threshing and separating means rotatably mounted to the frame having a first threshing portion and a second separating portion for threshing the crop material and separating the grain therefrom;
    (c) an elongate casing means surrounding the threshing and separating means fastened to the frame, the casing being adjacent the threshing and separating means and generally cylindrical in shape;
    (d) grain receiving means underlying the threshing and separating means to receive the threshed and separated grain;
    (e) grate means attached to the casing means generally concave in shape and generally underlying the threshing and separating means and overlying the grain receiving means cooperative with the threshing and separating means to thresh the grain from the crop material and permit the threshed grain to pass therethrough to the grain receiving means; and
    (f) a rotor access module having a first portion attached to said frame, and having a second portion forming a concave portion of said casing means, said second portion including a plurality of threshing bars, said first and second portions interconnected, in spaced apart relationship, by side plates, said module further having at least one deflector plate pivotally connected between said side plates.

5. In a harvesting and threshing machine for harvesting grain bearing crop material from a field having a mobile frame, at least one axial flow threshing and separating means rotatable about an axis, the threshing and separating means having a periphery rotatable about the axis in a predetermined path that is at least partially generally cylindrical, a casing means surrounding the threshing and separating means having an upper portion and a lower portion, at least the lower portion having grate means attached thereto to permit threshed grain to pass therethrough, the improvement comprising:

a rotor access module having a first portion attached to said frame, and having a second portion forming a concave portion of said casing means, said second portion including a plurality of threshing bars, said first and second portions interconnected, in spaced apart relationship, by side plates, said module further having at least one deflector plate connected to said side plates; and means connected for pivotally moving said deflector plates.

* * * * *